US012097507B1

(12) United States Patent
Roth et al.

(10) Patent No.: US 12,097,507 B1
(45) Date of Patent: Sep. 24, 2024

(54) REINFORCED SCREEN CLOTHS

(71) Applicant: SYNCRUDE CANADA LTD. in trust for the owners of the Syncrude Project as such owners exist now and in the future, Calgary (CA)

(72) Inventors: Hugh Roth, Edmonton (CA); Dan Wolfe, Edmonton (CA); Ron Cleminson, Fort McMurray (CA)

(73) Assignee: SYNCRUDE CANADA LTD. IN TRUST FOR THE OWNERS OF THE SYNCRUDE PROJECT AS SUCH OWNERS EXIST NOW AND IN THE FUTURE, Calgary (CA)

( * ) Notice: Subject to any disclaimer, the term of this patent is extended or adjusted under 35 U.S.C. 154(b) by 0 days.

(21) Appl. No.: 18/342,583

(22) Filed: Jun. 27, 2023

(51) Int. Cl.
*B03B 5/48* (2006.01)

(52) U.S. Cl.
CPC .................................... *B03B 5/48* (2013.01)

(58) Field of Classification Search
CPC ........................................................ B03B 5/48
See application file for complete search history.

(56) References Cited

U.S. PATENT DOCUMENTS

| | | | | |
|---|---|---|---|---|
| 11,679,416 B1 * | 6/2023 | Obaia | B07B 1/4645 209/363 |
| 2013/0092608 A1 * | 4/2013 | Tieu | B07B 1/4609 209/392 |
| 2022/0267678 A1 * | 8/2022 | Obaia | B07B 1/40 |

FOREIGN PATENT DOCUMENTS

| | | |
|---|---|---|
| CA | 2755026 | 4/2013 |
| CA | 2899467 | 2/2016 |
| CA | 2950365 | 2/2017 |

* cited by examiner

*Primary Examiner* — Michael McCullough
*Assistant Examiner* — Kalyanavenkateshware Kumar
(74) *Attorney, Agent, or Firm* — Bennett Jones LLP

(57) ABSTRACT

A reinforced screen cloth for use in a screening device for screening out oversize objects, including oil sand lumps and rocks present in an oil sands slurry, is provided comprising a plurality of anti-wear components affixed to a base plate having a plurality of openings.

11 Claims, 4 Drawing Sheets

REINFORCED SCREEN CLOTHS

TECHNICAL FIELD

The present application relates generally to a reinforced screen cloth particularly useful for vibrating screens for screening oversize objects in a material such as those found in an oil sand slurry.

BACKGROUND

Vibrating, rotating and/or stationary screens are used in the oil sand industry, in particular, in oil sand slurry preparation plants. Oil sand, such as is mined in the Fort McMurray region of Alberta, generally comprises water-wet sand grains held together by a matrix of viscous bitumen. It lends itself to liberation of the sand grains from the bitumen by mixing or slurrying the oil sand in water, allowing the bitumen to move to the aqueous phase.

As-mined or pre-crushed oil sand is generally mixed with warm or hot water to yield an oil sand slurry. The slurry is then conditioned in a hydrotransport pipeline and subsequently introduced into a large, open-topped, conical-bottomed, cylindrical vessel commonly termed a primary separation vessel (PSV) where the more buoyant aerated bitumen rises to the surface and forms a bitumen froth layer.

It may be desirable to remove the larger aggregates present in oil sand slurry prior to pipelining in order to avoid blockage or damage of downstream equipment, e.g., pump component wear. Thus, vibrating, rotating and/or stationary screens may be used at various points during slurry preparation to reject larger lumps of oil sand, rocks and other aggregates, which are large enough to block or damage downstream equipment, prior to pipeline conditioning. Screens may also be used to further screen oil sand tailings slurry prior to treating/disposing same.

However, oil sand slurry is extremely heavy and abrasive due to the large amount of sand, gravel and crushed rock contained therein. Further, in particular with primary vibrating screens, these screens are generally vibrating with an acceleration of approximately 4-5 g, so that all oil sand slurried material passes over and through the screen cloths of the vibrating screen. This results in the rapid spalling and eventual wearing through of the screen cloths of the vibrating screen ("hole-throughs"), which can lead to production interruption and an unplanned maintenance event.

Vibratory screen cloths in particular require both wear resistance and fatigue crack resistance to meet the needs in oil sand screening. There are currently two broad types of screen cloths currently used at the applicant's site, namely, PTAW overlay screen cloths and screen cloths having tungsten carbide tiles brazed thereon. However, PTAW overlay screen cloths do not have sufficient wear resistance and brazed tungsten carbide tiled screen cloths are prone to tile loss and/or fatigue failures.

SUMMARY

The current application is directed to screen cloths useful for screening an abrasive slurry such as an oil sand slurry having oversize reject material. Use of the present invention extends the running time of a vibrating screening device so that the operator does not have to shut down the screening device as frequently to replace the impact screen cloths. It is understood, however, that the screen cloths of the present invention can also be used with rotating and/or stationary screening devices.

Broadly stated, in one aspect, a reinforced screen cloth for use in a screening device for screening out oversize objects, including oil sand lumps and rocks, is provided, comprising:

a base plate having a plurality of openings; and a plurality of anti-wear components, each anti-wear component comprising at least one anti-wear tile having a front face and a back face; a layer of material comprising a metallic alloy affixed to the back face of the at least one anti-wear tile; and an anchor member affixed to the metallic alloy layer;

whereby the anchor member is configured to attach each anti-wear component to the base plate such that the front face of the at least one anti-wear tile is exposed on a top surface of the screen cloth.

In one embodiment, the openings of the base plate are round and the anti-wear components are inserted into the openings such that the anchor member is affixed to an inner surface of the opening.

In one embodiment, the openings are rectangular or square and are formed from a plurality of transverse and longitudinal ligaments, whereby the anchor member is configured to fit over the ligaments.

In one embodiment, the metallic alloy layer is affixed to the anti-wear tile by hot isostatic pressing, brazing or diffusion bonding. In one embodiment, the anchor member is affixed to the metallic alloy layer by a compatible metal joining technique known in the art including friction welding, brazing, diffusion bonding, soldering, and welding. In one embodiment, the anti-wear component is affixed to the base plate by welding, soldering, brazing, mechanically fastening with mechanical fasteners such as screws, bolts, taper pin, stud, and split pin, riveting or gluing with epoxy and the like, the anchor member to the base plate.

In one embodiment, the base plate is cast or forged from carbon steel, low alloy steel, stainless steel, or other strong material (e.g. nickel or cobalt based alloys). In one embodiment, the anti-wear tiles are comprised of cemented or sintered carbide. In one embodiment, the cemented or sintered carbide may contain varying proportions of tungsten carbide (WC), titanium carbide (TiC), tantalum carbide (TaC) or niobium carbide (NbC) and others. In one embodiment, the anti-wear tiles are comprised of cemented or sintered tungsten carbide.

In one embodiment, the brazing material comprises an alloy comprising aluminum, copper, nickel or silver or combinations thereof.

In another aspect of the present invention, a method is provided for manufacturing an anti-wear component for attaching to a base plate having a plurality of openings to form a screen cloth for use in a screening device for screening out oversize objects, including oil sand lumps and rocks, comprising:

affixing a metallic alloy layer to a back face of at least one anti-wear tile by hot isostatic pressing, brazing or diffusion bonding;

attaching an anchor member to the metallic alloy layer by a compatible metal joining technique; and machining the anchor member so that the anti-wear component can be affixed to the base without obscuring the plurality of openings.

In one embodiment, the compatible metal joining technique is selected from friction welding, brazing, diffusion bonding, soldering, and welding.

Additional aspects and advantages of the present invention will be apparent in view of the description, which follows. It should be understood, however, that the detailed description and the specific examples, while indicating preferred embodiments of the invention, are given by way of illustration only, since various changes and modifications will become apparent to those skilled in the art from this detailed description.

BRIEF DESCRIPTION OF THE DRAWINGS

Referring to the drawings wherein like reference numerals indicate similar parts throughout the several views, several aspects of the present invention are illustrated by way of example, and not by way of limitation, in detail in the following figures. It is understood that the drawings provided herein are for illustration purposes only and are not necessarily drawn to scale

DETAILED DESCRIPTION

Figure 1:
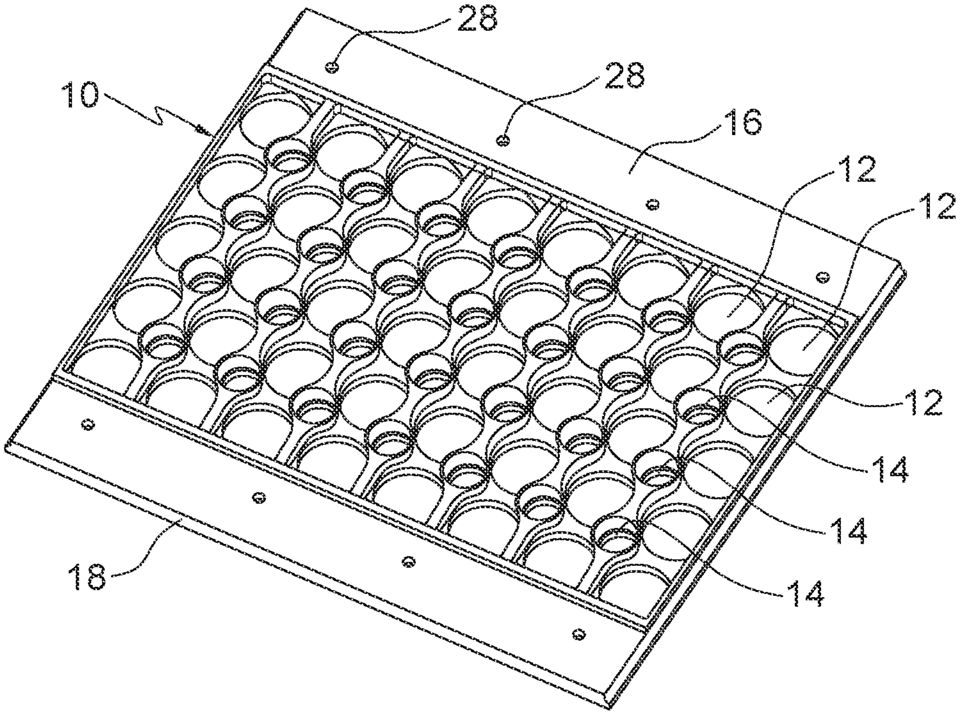
FIG. 1 is a perspective view of the bottom face of a base plate having a plurality of spherical openings.

The detailed description set forth below in connection with the appended drawings is intended as a description of various embodiments of the present application and is not intended to represent the only embodiments contemplated. The detailed description includes specific details for the purpose of providing a comprehensive understanding of the present application. However, it will be apparent to those skilled in the art that the present application may be practised without these specific details.

The following relates generally to a screen cloth with improved wear properties for use in screening raw materials such as crushed oil sand, ores and the like, for example, screening an oil sand slurry using a vibrating screening device comprising the screen cloths. Each screen cloth is comprised of a base plate having openings therethrough, which openings can be circular, oval, rectangular, square and the like, and a plurality of anti-wear components comprised of anti-wear tiles, the tiles preferably made from cemented or sintered carbide such as cemented or sintered tungsten carbide.

As used herein, "cemented or sintered carbides" are metal matrix composites where carbide particles act as the aggregate and a metallic binder serves as the matrix. They consist of fine particles of carbide cemented into a composite by a binder metal. Cemented carbides commonly use tungsten carbide (WC), titanium carbide (TiC), or tantalum carbide (TaC) as the aggregate. Common binders include cobalt, nickel, chromium, iron, molybdenum or combinations thereof.

As used herein, an "anti-wear tile" is an element, often in the form of tiles or plates that are square, rectangular or other shape, that is comprised of a cemented or sintered carbide. An anti-wear tile is preferably made from cemented or sintered tungsten carbide that is comprised of tungsten carbide particles held together by an interpenetrating film of cobalt or cobalt alloy. It is understood that other binders metals or metal alloys other than cobalt or cobalt alloy could also be used to cement the carbide particles. The various grades of cemented or sintered tungsten carbide depends on the size of the tungsten carbide particles, the percentage of alloy binding phase, and the amount of alloying in the binder phase.

As used herein, "brazing" is a metal-joining process in which two or more metal items are joined together by melting and flowing a filler metal into the joint, with the filler metal having a lower melting point than the adjoining metal. The filler metal is brought slightly above its melting (liquid) temperature. The melted (liquid) filler metal then flows over the base metal (in a process known as wetting) and is then cooled to join the work pieces together. A major advantage of brazing is the ability to join the same or different metals with considerable strength. The filler material forms an interface layer or joining interlayer. In summary, brazing is a metal joining process in which base metals are joined without exceeding their melting temperature using a braze filler metal melted at a temperature above 840° F. Braze filler metals are designed to fit base metal, temperature, connection design, brazing process, and the stress needed to be transmitted. Suitable brazing materials are aluminum, copper, nickel and silver, or combinations thereof, with silver alloys being the most versatile.

As used herein, "diffusion bonding" is a technique used in metalworking that is capable of joining similar and dissimilar metals. In the present method, diffusion bonding comprises joining an alloy member with a cemented (or sintered) carbide member such as cemented (or sintered) tungsten carbide. Diffusion bonding is conducted in a special equipment in vacuum $p<0.5$ Pa. The bonding parameters (temperature, applied pressure) correspond to optimum ones limited by the critical creep strain $0.1<\Delta<0.2$ mm of joint section.

As used herein, "hot isostatic pressing" or "HIP" involves the simultaneous application of high pressure (15,000 to 45,000 psi) and elevated temperatures (up to 2500° C.) in a specially constructed vessel. The pressure is usually applied with an inert gas such as argon, and so is "isostatic". Under these conditions of heat and pressure internal pores or defects within a solid metal body collapse and diffusion bonding occurs at the interfaces. Encapsulated powder and sintered components can also be fully densified to give improved mechanical properties.

As used herein, "friction welding" or "FRW" is a solid-state welding process that generates heat through mechanical friction between work pieces in relative motion to one another, with the addition of a lateral force called "upset" to plastically displace and fuse the materials. Because no melting occurs, friction welding is not a fusion welding process in the traditional sense, but more of a forge welding technique. The combination of fast joining times (on the order of a few seconds), and direct heat input at the weld interface, yields relatively small heat-affected zones. Friction welding techniques are generally melt-free, which mitigates grain growth in engineered materials, such as high-strength heat-treated steels. Another advantage of friction welding is that it allows dissimilar materials to be joined together.

As used herein, "linear friction welding" is a type of friction welding where the accelerated component oscillates with linear movements. In linear friction welding, one of the components to be joined is firmly clamped. The other component is accelerated with a linear movement. Then the two parts are pressed together with high pressure. This creates friction heat. The resulting weld flash is optionally trimmed off the end(s). Linear friction welding results in friction over the entire welding area. This means that difficult-to-process materials, such as titanium or nickel-based alloys can be joined easily and quickly. Linear friction welding can join dissimilar metals not considered compatible using conventional welding methods and is able to join a nearly limitless number of shapes and complex part geometries.

FIG. 1 is an underside view of one embodiment of a base plate used in the manufacturing of the screen cloths of the present application. In particular, in this embodiment, base plate 10 is machined from a 4" plate made from steel to form a plurality of round larger openings 12 and a plurality of round smaller openings 14. The base plate 10 further comprises two mutually opposing lateral attachment regions 16, 18, each region having at least one hole 28 therethrough for attaching the finished screen cloth to a screen device (not shown) such as a vibrating screen device by means of screws and the like.

Figure 2:
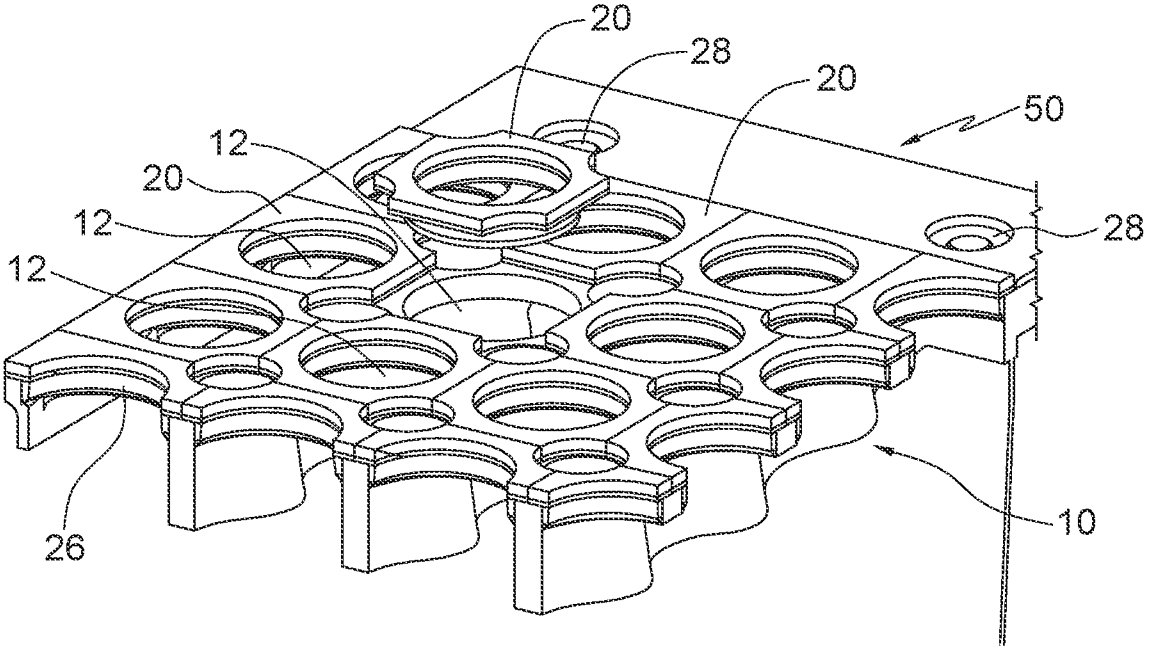
FIG. 2 is a perspective view of a portion of one embodiment of a screen cloth having a plurality of anti-wear components attached to a top face of the base plate of FIG. 1.
Figure 3:
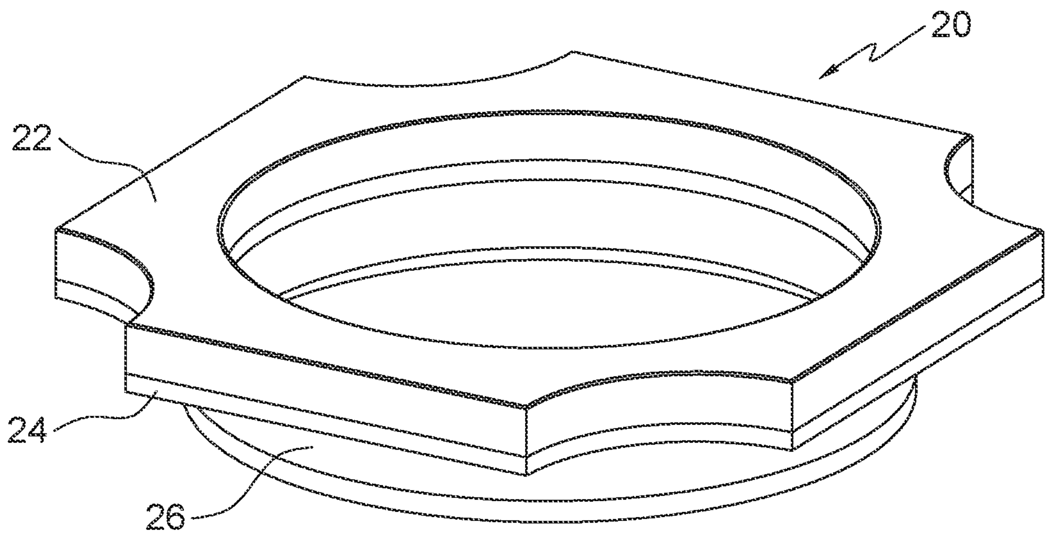
FIG. 3 is a perspective view of one embodiment of an anti-wear component of FIG. 2.

FIG. 2 shows a portion of one embodiment of a finished screen cloth 50, whereby a plurality of anti-wear components 20 have been affixed to the front face of base plate 10 of FIG. 1 by welding same to the base plate 10. FIG. 3 is a perspective view of one of the anti-wear components 20, which has been machined to fit into larger openings 12 of base plate 10, as shown in FIG. 2. Anti-wear component 20 is comprised of three distinct parts, namely, anti-wear tile 22, which comprises a carbide; metallic alloy layer 24, which can be an alloy such as Kovar™; and anchor member 26, which can be made of carbon steel and the like. It can be seen in FIG. 3 that the anchor member 26 has been machined to fit inside the larger openings 12, where it is welded to the base plate 10 using a rotary weld, for example, 6 mm continuous circumferential fillet welds.

In one embodiment, anti-wear component 20 is manufactured as follows. An anti-wear tile, for example, a tungsten carbide tile, and a metallic alloy, for example, a nickel-cobalt ferrous alloy (often referred to a FerNiCo alloy) such as Kovar™ are first bonded (affixed) together using hot isostatic pressure (HIP). In one embodiment, the FerNiCo alloy is comprised of 29% nickel, 17% cobalt and the balance being iron. It is understood, however, that brazing can be used to clad the anti-wear tile with the metallic alloy layer, for example, by using an interface layer or filler metal such as an alloy comprising copper and nickel, such as AMS4764, a 52.5Cu 38Mn 9.5Ni braze alloy. In the alternative, diffusion bonding, for example, using an interface layer such as copper, nickel, silver or a nickel and copper alloy, can also be used to clad the anti-wear tile with the metallic alloy layer. The metallic alloy layer is then affixed to a carbon steel plate by using any compatible metal joining technique known in the art, for example, linear friction welding. The carbon steel plate is then machined to fit into the openings of the base plate and form the anchor member 26. The anti-wear tile and the metallic alloy layer are also machined to form anti-wear tile 22 and metallic alloy layer 24 such that a top surface of the base plate 10 is covered with anti-wear components 20, with anti-wear tile 22 exposed on the surface or front face of finished screen cloth 50, without any blockage of the openings 12, 14. In other words, the anti-wear components 20 are aligned with one another with minimal space or gap between the edges of each anti-wear component 20 and the next one (e.g., 1 mm or less). In one embodiment, the anti-wear tile 22 is about 10 mm thick, the metallic alloy layer 24 is about 4 mm thick and the carbon steel anchor plate that ultimately forms anchor member 26 is 16 mm thick.

Figure 4:
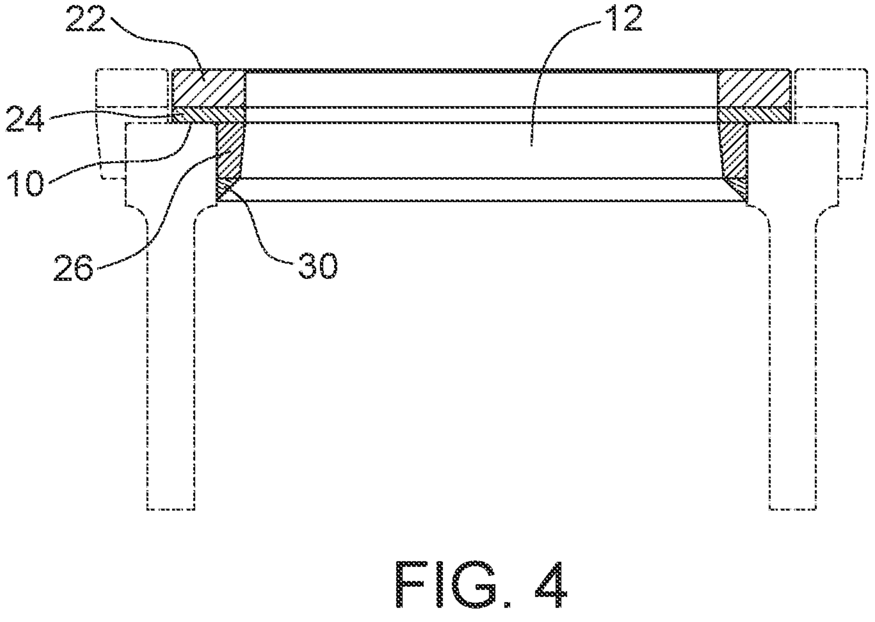
FIG. 4 is a cross sectional view of an anti-wear component of FIG. 3 that has been welded to a base plate.

FIG. 4 is a cross section of one of the anti-wear components shown in FIG. 3 that has been welded to the base plate without obstructing the larger opening 12 in the base plate 10. FIG. 4 illustrates how anchor member 26 fits into larger opening 12 of base plate 10 and is welded thereto with circular weld 30 such that anti-wear tile 22 and metallic alloy layer 24 sit on top of the front face of base plate 10 to provide wear protection.

Figure 5:
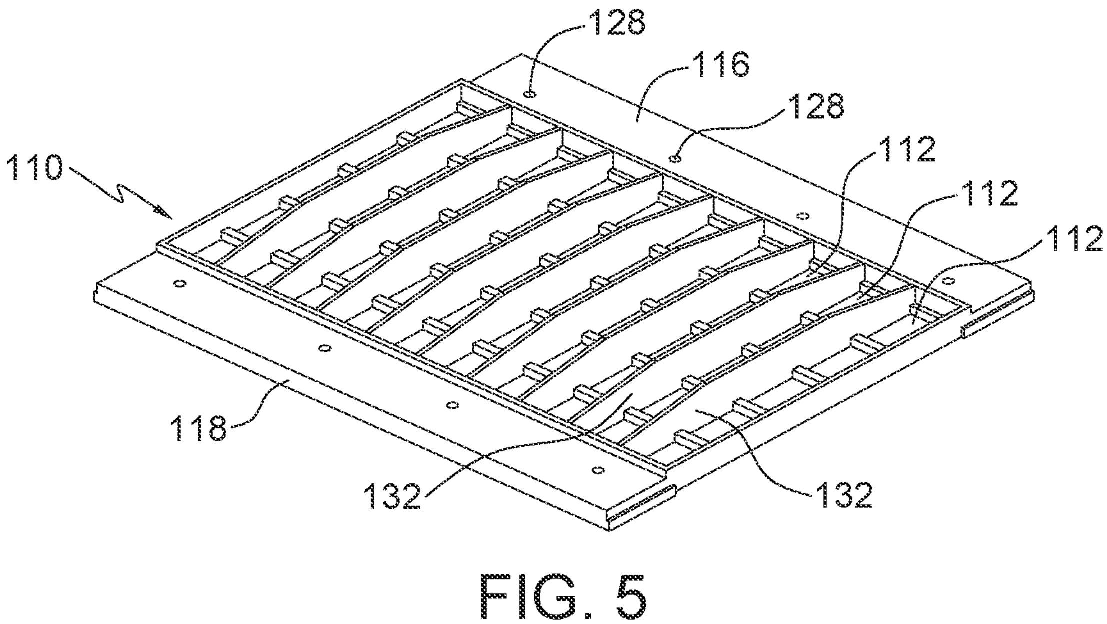
FIG. 5 is a perspective view of the bottom face of a base plate having a plurality of rectangular openings.

FIG. 5 is an underside view of another embodiment of a base plate used in the manufacturing of the screen cloths of the present application. In particular, in this embodiment, base plate 110 is machined from a 4" plate made from steel to form a plurality of rectangular openings 112. The base plate 110 further comprises two mutually opposing lateral attachment regions 116, 118, each region having at least one hole 128 therethrough for attaching the finished screen cloth to a screen device (not shown) such as a vibrating screen device by means of screws and the like. In this embodiment, base plate 110 further comprises a plurality of stiffeners 132 to provide additional support for the finished screen cloth.

Figure 6:
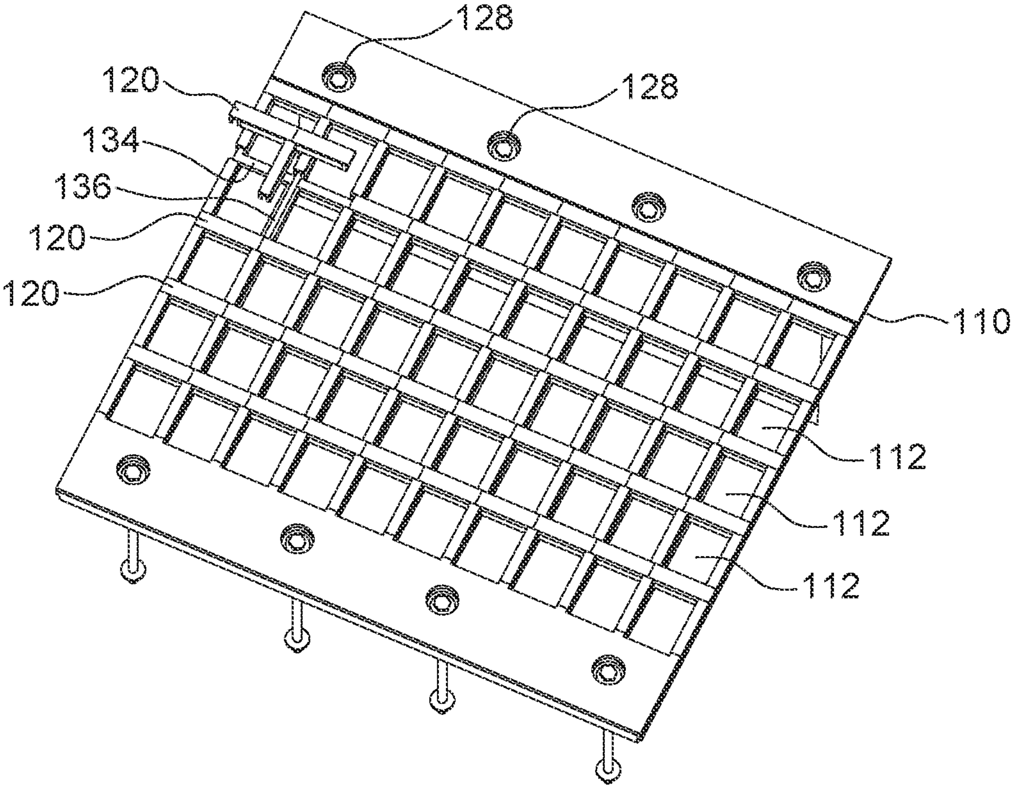
FIG. 6 is a perspective view of one embodiment of a screen cloth having a plurality of anti-wear components attached to a top face of the base plate of FIG. 5.
Figure 7:
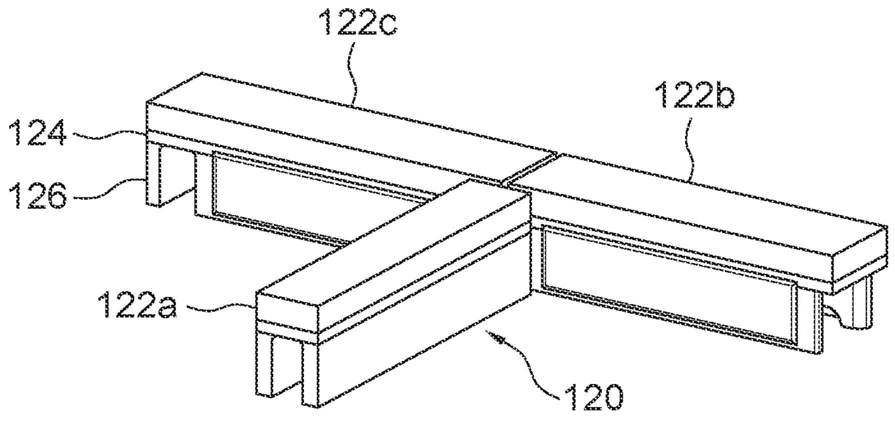
FIG. 7 is a perspective view of one embodiment of an anti-wear component of FIG. 6.

FIG. 6 shows a finished screen cloth 150 comprising base plate 110 of FIG. 5, whereby a plurality of anti-wear components 120 have been affixed to the front face of base plate 110 by welding same to the base plate 110. FIG. 7 is a perspective view of one of the anti-wear components 120, which has been machined to fit over the transverse and longitudinal ligaments, 134 and 136, respectively, that form the plurality of rectangular openings 112 of base plate 110, as shown in FIG. 6. In one embodiment, anti-wear component 120 is comprised of three distinct layers, namely, a top layer comprised of three anti-wear tiles 122*a*, 122*b* and 122*c*, each tile comprised of a carbide; metallic alloy layer 124, which can be an alloy such as Kovar™; and anchor member 126, which can be made of carbon steel and the like, forming a T-like configuration. It is understood, however, that anti-wear component 120 can take on a variety of different configurations, for example, U-shaped, M-shaped, etc.

Figure 8:
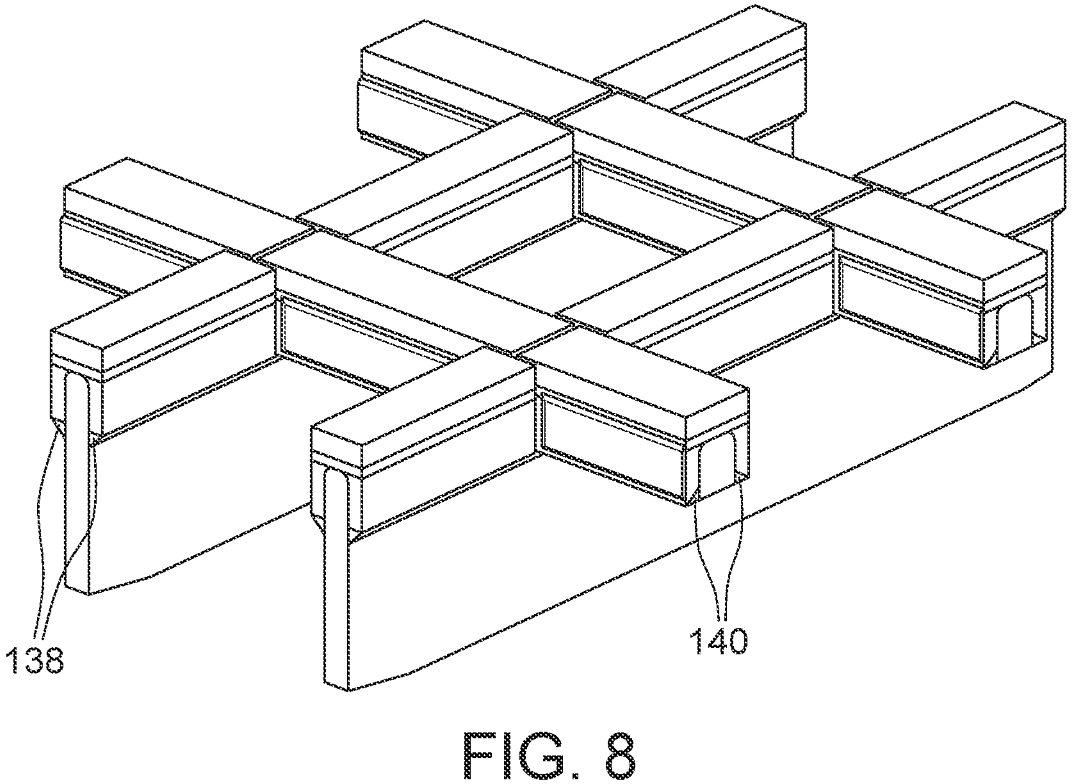
FIG. 8 is a perspective view of a plurality of anti-wear components of FIG. 7 showing transverse and longitudinal welding spots.

It can be seen in FIG. 7 that the anchor member 126 has been machined to fit over the transverse and longitudinal ligaments that form the rectangular openings, where it is welded to the base plate 110 using a plurality of 6 mm thick longitudinal attachment welds 138 and a plurality of 6 mm thick transverse attachment welds 140, as shown in FIG. 8, a typical cross section of a portion of screen cloth 150.

Much the same as anti-wear component 20, anti-wear component 120 can be manufactured as follows. A number of anti-wear tiles comprising, for example, tungsten carbide, and a metallic alloy, for example, a nickel-cobalt ferrous alloy (often referred to a FerNiCo alloy) such as Kovar™, are first bonded (affixed) together using hot isostatic pressure (HIP). In one embodiment, the FerNiCo alloy is comprised of 29% nickel, 17% cobalt and the balance being iron. The metallic alloy layer is then affixed to a carbon steel plate by using a compatible metal joining technique known in the art, for example, linear friction welding, brazing, diffusion bonding, soldering, or welding. The carbon steel plate is then machined to fit over the ligaments of the base plate and form the anchor member. The anti-wear tiles and the metallic alloy layer are also machined so as not to obscure the rectangular openings of the screen cloth. Hence, the finished anti-wear component comprises an upper layer of anti-wear tiles, a middle layer of metallic alloy and a bottom portion comprising a carbon steel anchor member, such that when the anti-wear component is attached to the base plate, the top surface of the base plate is now covered with anti-wear components, where the anti-wear tiles are exposed on the surface or front face of the finished screen cloth, without any blockage of the openings.

It was discovered that using anti-wear tiles coated at the bottom surface with a compatible material such as metallic alloy, for example, a nickel-cobalt ferrous alloy (often referred to a FerNiCo alloy) such as Kovar™, and attaching a carbon steel anchor to the metallic alloy to anchor the carbide tile to a steel base plate minimized residual stress due to thermal expansion. This will render the anti-wear tiles, which are carbide, more resistant to cracking and fracture. Further, having a steel anchor allows the anti-wear components to be affixed to the base plate, for example, by welding, in low stress areas and desirable orientations.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such module, aspect, feature, structure, or characteristic with other embodiments, whether or not explicitly described. In other words, any module, element or feature may be combined with any other element or feature in different embodiments, unless there is an obvious or inherent incompatibility, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

The term "about" can refer to a variation of ±5%, 10%, 20%, or +25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

The scope of the claims should not be limited by the preferred embodiments set forth in the examples, but should be given the broadest interpretation consistent with the description as a whole.

The invention claimed is:

1. A reinforced screen cloth for use in a screening device for screening out oversize objects, including oil sand lumps and rocks, comprising:

a base plate having a plurality of openings; and a plurality of anti-wear components, each anti-wear component comprising at least one anti-wear tile having a front face and a back face; a layer of material comprising a metallic alloy affixed to the back face of the at least one anti-wear tile; and an anchor member affixed to the metallic alloy layer;

whereby the anchor member is configured to attach each anti-wear component to the base plate such that the front face of the at least one anti-wear tile is exposed on a top surface of the screen cloth.

2. The screen cloth as claimed in claim 1, wherein the openings of the base plate are round and the anti-wear components are inserted into the openings such that the anchor member is affixed to an inner surface of the opening.

3. The screen cloth as claimed in claim 1, wherein the openings are rectangular or square and are formed from a plurality of transverse and longitudinal ligaments, whereby the anchor member is configured to fit over the ligaments.

4. The screen cloth as claimed in claim 1, wherein the metallic alloy layer is affixed to the anti-wear tile by hot isostatic pressing, brazing or diffusion bonding.

5. The screen cloth as claimed in claim 1, wherein the anchor member is affixed to the metallic alloy layer by a compatible metal joining technique including friction welding, brazing, diffusion bonding, soldering, and welding.

6. The screen cloth as claimed in claim 1, wherein the anti-wear component is affixed to the base plate by welding, soldering, brazing, or mechanically fastening with mechanical fasteners, the anchor member to the base plate.

7. The screen cloth as claimed in claim 1, wherein the base plate is cast or forged from carbon steel, low alloy steel, or stainless steel.

8. The screen cloth as claimed in claim 1, wherein the anti-wear tiles are comprised of cemented or sintered carbide.

9. The screen cloth as claimed in claim 8, wherein the cemented or sintered carbide contain varying proportions of tungsten carbide (WC), titanium carbide (TiC), tantalum carbide (TaC) or niobium carbide (NbC).

10. The screen cloth as claimed in claim 1, wherein the anti-wear tiles are comprised of cemented or sintered tungsten carbide.

11. The screen cloth as claimed in claim 1, wherein the metallic alloy comprises aluminum, copper, nickel or silver or combinations thereof.

* * * * *